Sept. 1, 1970     R. W. CONDON ET AL     3,526,156
SAW CHAIN SHARPENING MEANS
Filed April 17, 1968     3 Sheets-Sheet 1
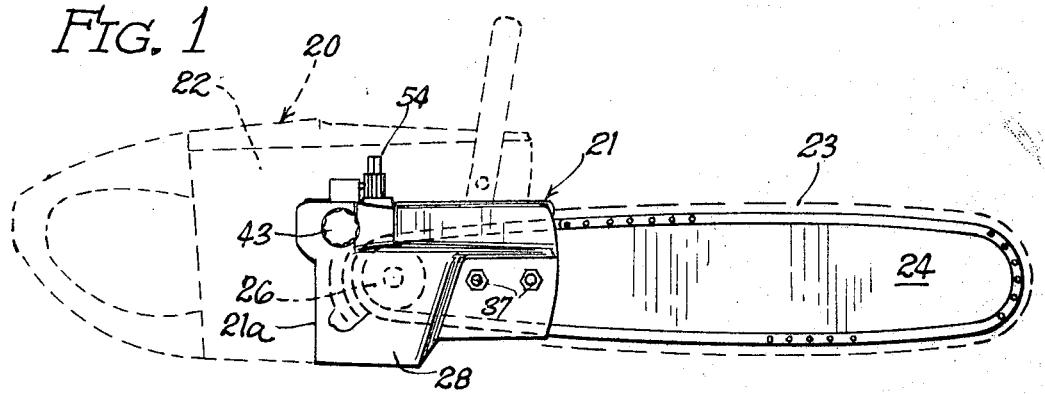
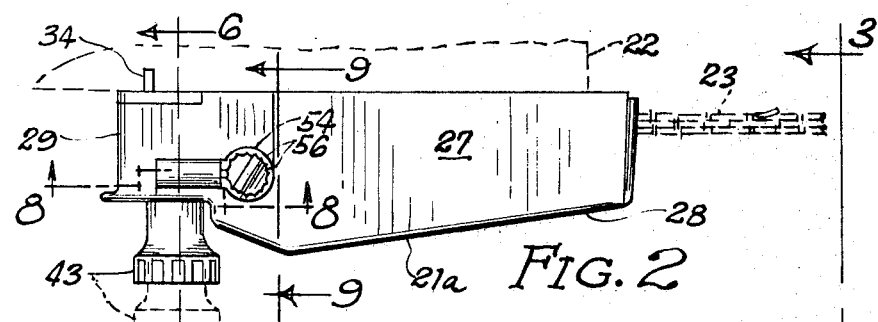
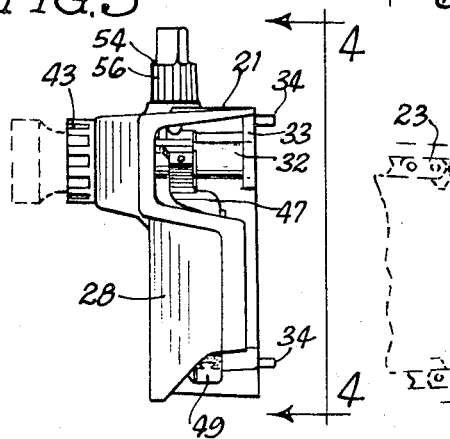
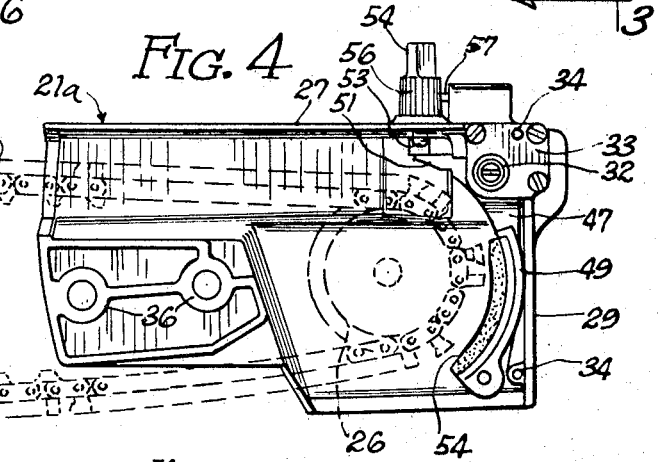
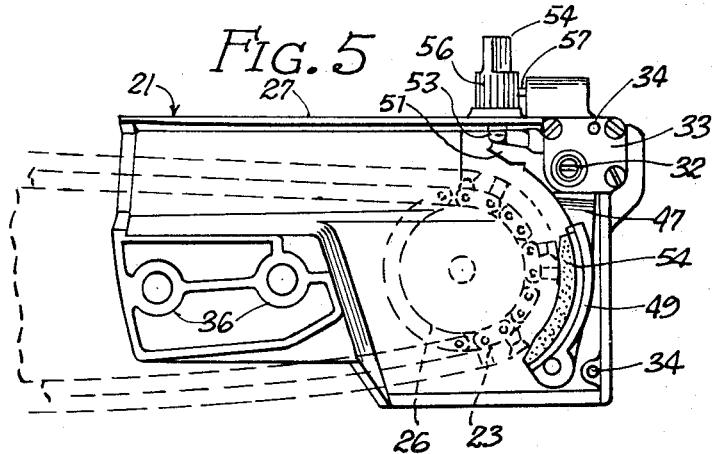
INVENTORS
Richard W. Condon
Vernon L. Krabbe
Nathan N. Kraus
Frank H. Marks Attys Sept. 1, 1970     R. W. CONDON ET AL     3,526,156
SAW CHAIN SHARPENING MEANS
Filed April 17, 1968     3 Sheets-Sheet 3
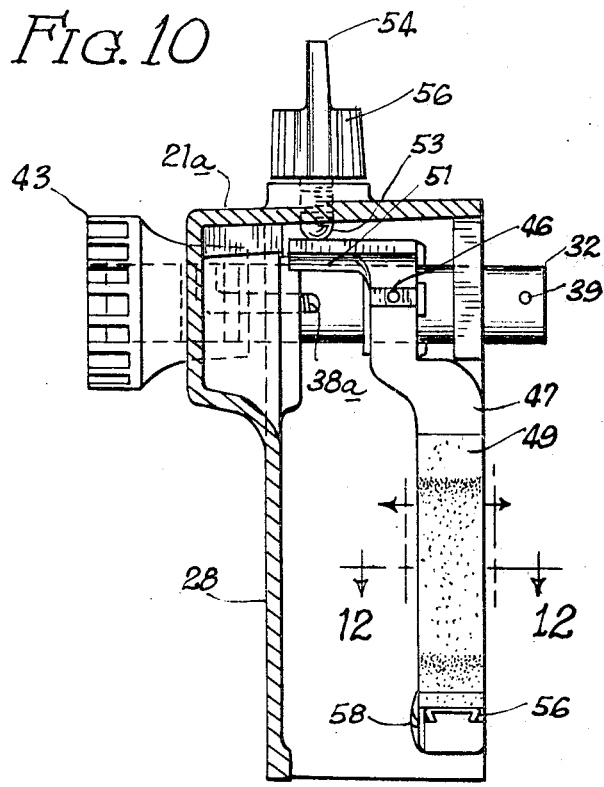
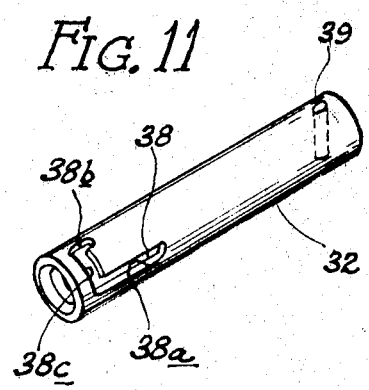
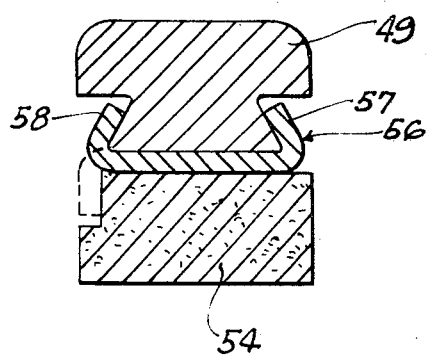

United States Patent Office 3,526,156
Patented Sept. 1, 1970

3,526,156
SAW CHAIN SHARPENING MEANS
Richard W. Condon, Park Forest, and Vernon L. Krabbe, Beecher, Ill., assignors, by mesne assignments, to Omark Industries, Inc., Portland, Oreg., a corporation of Oregon
Filed Apr. 17, 1968, Ser. No. 721,956
Int. Cl. B23d 63/12
U.S. Cl. 76—25          9 Claims

ABSTRACT OF THE DISCLOSURE

A device for sharpening a saw chain while the chain is mounted upon the sprocket and guide bar of a chain saw and while being driven by the sprocket. The device includes a housing adapted to be mounted on the body of a chain saw to enclose the sprocket and a portion of the guide bar. A shaft is supported in the housing for rotatable and axial movement and an operating knob is telescopically mounted on the shaft exteriorly of the housing. The arm carries an arcuate sharpening element arranged in close proximity to the sprocket and the sharpening element is movable into and out of operative position and is oscillatable relative to the chain by movement of the knob.

This invention relates to saw chain sharpening means. More particularly, this invention relates to sharpening means constituting a permanent component part of a chain saw and being selectively operable to sharpen the saw chain upon the saw while the saw is in operation thereby avoiding the necessity to take the saw out of service for purposes of sharpening the chain.

One of the objects of this invention is a provision of sharpening means constituting a component part of the chain saw so that it is always available for use.

Another object of this invention is a provision of sharpening means enclosed within a housing associated with the chain saw, with the controls disposed outwardly for convenience in manipulation. In the event of breakage of the sharpening means during a sharpening operation, any parts broken away will be prevented from flying off and causing injury.

Other and further objects and advantages of this invention will become apparent from the following description when the same is considered in connection with the accompanying drawings in which, FIG. 1 is a more or less diagrammatic side elevational view of a chain saw, illustrated in broken lines, and showing the sharpening means of our invention, illustrated in solid lines, in association therewith.

FIG. 2 is a top plan view of the sharpening means illustrated in FIG. 1.

FIG. 3 is an end elevational view looking in the direction of the arrows 3—3 of FIG. 2.

FIG. 4 is a rear elevational view looking in the direction of the arrows 4—4 of FIG. 3 and showing the sharpening element in nonoperative position.

FIG. 5 is a view similar to FIG. 4 but showing the sharpening element in operative position.

FIG. 10 is a view similar to FIG. 9, but showing the sharpening element in operative position.

FIG. 11 is a perspective view of a structural detail and

FIG. 12 is a cross-sectional view, on an enlarged scale, taken substantially on line 12—12 of FIG. 10.

Figure 6:
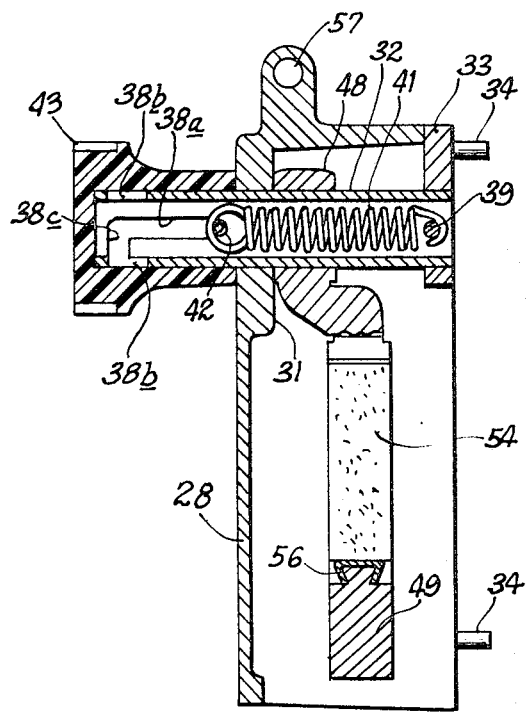
FIG. 6 is a cross-sectional view, on an enlarged scale, taken substantially on line 6—6 of FIG. 2, and showing the sharpening element in nonoperative position.

Referring to the drawings, the numeral 20 indicates, generally, a chain saw illustrated in broken lines and having a saw chain sharpening device 21 mounted upon the motor housing or body 22 of the saw in position to sharpen a saw chain 23 mounted on a guide bar 24 extending from the body of the saw. The saw chain 23 is mounted upon and driven by a chain saw sprocket 26 driven by a motor, not shown. The motor housing, guide bar and saw chain are conventional and form no part of the present invention.

The sharpening device of our invention includes a housing 21a shaped substantially as illustrated in FIGS. 1 and 2, and adapted for mounting on the body 22 of chain saw in complementary relation thereto, so as to enclose the sprocket 26 and a portion of the guide bar 24 and saw chain 23. The housing 21a includes a top wall 27 an integral sidewall 28 which is stepped as illustrated, and a rear wall 29. The housing 21a is fully open at the inner side and at the forward end thereof. The rearward portion of the housing provides an enlarged chamber to accommodate the chain sprocket 26 and drive shaft, while the forward portion is of reduced width to provide a chamber merely sufficient to accommodate the guide bar and saw chain. The rearward portion of the wall 28 is provided with a boss 31 which is drilled to slideably support a tubular shaft 32 which also passes through a bearing aperture in a plate 33 attached as by screws to the housing. A pair of pins 34 project laterally from the housing 21a, said pins being received in cooperating apertures in the body 22 of the saw for purposes of accurately locating the housing with respect to the body in assembly. The forward portion of the housing 21a is provided with a pair of bosses 36 which are drilled to receive the studs 37 which also pass through the guide bar 24 and which serve to secure the guide bar and the housing to the body.

The shaft 32 is provided at one end with diametrically opposed bayonet type slots 38, substantially as illustrated in FIG. 11, each such slot including longitudinally extending portions 38a and 38b connected by a circumferentially portion extending 38c. It will be understood that corresponding portions of said slots are arranged in diametrical registration. At the opposite end, the shaft 32 is drilled to accommodate a press fitted pin 39 to which one end of a tension spring 41 is anchored, the other end of the spring being anchored to a pin 42 which passes through the slots 38 and is fixed in an actuating knob 43 which is provided with a bore 44 to slidably receive one end of the shaft 32. As will be apparent, the spring 41 normally biases the knob 43 to the right end of each of the slot portions 38a and 38b, as viewed in FIGS. 6 and 7.

Secured to the shaft 32 as with a pin 46 for movement therewith is an arcuate arm 47 including an enlarged portion 48 which is drilled to receive the shaft 32 and pin 46. The main body portion 49 of the arm 47 is offset from the enlarged portion 48, as illustrated in FIG. 9. Integral with the portion 48 is an arm portion 51 which extends forwardly and laterally, as illstrated in FIGS. 8 and 9.

Figure 8:
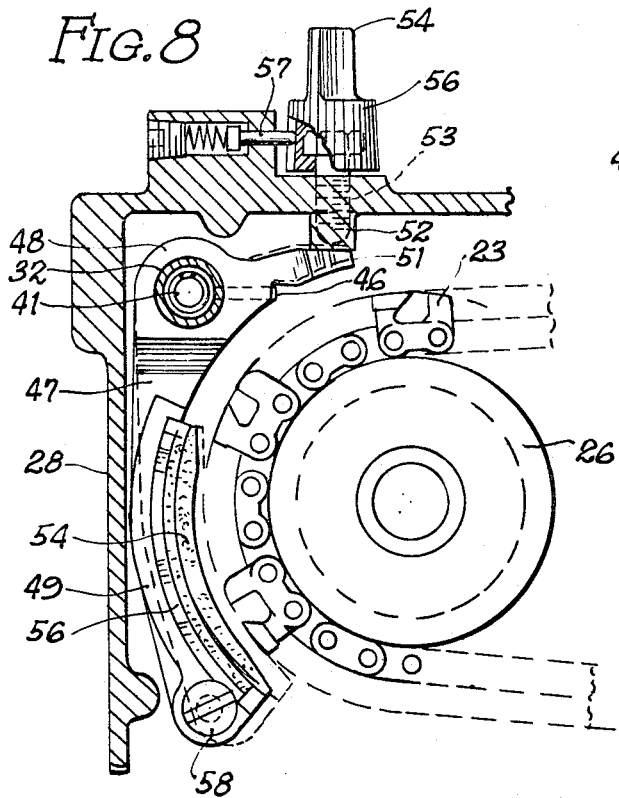
FIG. 8 is a cross-sectional view, on an enlarged scale, taken substantially on line 8—8 of FIG. 2 and showing the sharpening element in nonoperative position.
Figure 9:
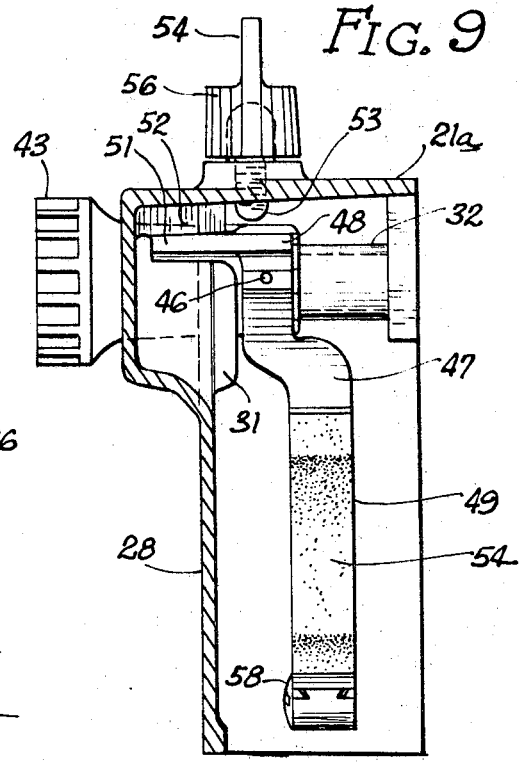
FIG. 9 is a cross-sectional view, on an enlarged scale, taking substantially on line 9—9 of FIG. 2.

The top wall 27 of the housing is provided on its underside with a depending boss 52 which is disposed in registration with the arm portion 51, as illustrated in FIGS. 8 and 9. The boss 52 extends inwardly from the outer wall 28 and terminates at a point in close proximity to an adjustable screw 53 which is threaded in the top wall 27 of the housing and is provided with a knob 54 having on its periphery a series of circumferentially spaced flutes 56 which cooperate with a spring biased detent 57 to secure the screw 53 in a position of adjustment. When the arm 47 and shaft 32 are moved to the extreme left position, as illustrated in FIG. 9, corresponding to nonoperative position, the arm portion 51 engages the boss 52 and, as will be seen in FIG. 8, such engagement limits the counterclockwise movement of the arm 47 about the axis of the shaft 32 thereby maintaining the arm in nonoperative position. When the shaft 32 and arm 47 are moved to operative position or to the right, as illustrated in FIG. 10, the arm portion 51 is free of the boss 52 and its movement in a counterclockwise direction, as viewed in FIG. 8, is now limited by the adjusted position of the screw 53.

The main body portion 49 of the arm 47 is dove-tailed throughout its length, as seen in cross section in FIG. 12 and an arcuate abrasive stone or sharpening element 54 is bonded to a correspondingly contoured shoe 56 which is provided with side flanges 57, shaped as illustrated in FIG. 12, to engage with the dovetail of the body portion 49. The shoe 56 is slid onto the dovetail from one end thereof and is secured by a retainer screw 58. It will be understood that the abrasive stone 54 and shoe 56 may be replaced when the stone becomes worn.

In out-of-use position, the arm 47 normally assumes the extreme left position, as illustrated in FIGS. 6 and 9, and in such position the stone 54 is disposed in a plane spaced laterally from the plane of the guide bar and saw chain and is also spaced rearwardly of the chain portion on the sprocket, as illustrated in FIG. 8. Also in nonoperative position the pin 42 of the operating knob 43 is disposed at the extreme right hand ends of the longer slot portions 38a of the shaft, as illustrated in FIG. 6. The tension of spring 41 tends to maintain the operating knob 43 in abutment with the outer surface of the wall 28 and also the arm portion 48 in abutment with the boss 31 on the inner surface of the wall 28, thereby holding the sharpening element 54 in nonoperative position.

In order to effect sharpening of the saw chain during its operation, the operating knob 43 is drawn outwardly or to the left, as viewed in FIG. 6, and rotated so as to position the pin 42 in th slots 38b of shaft 32. In such position, the end of the operating knob 43 is now spaced from the wall 28 a distance as indicated by the broken lines in FIG. 7. Accordingly, the knob 43 may now be moved inwardly or to the right to the solid line position, as viewed in FIG. 7, to a point where the stone 54 is disposed substantially in planar registration with the saw chain 23, and upon rotating the knob 43, the arm 47 is caused to be rocked in a counterclockwise direction, as viewed in FIG. 8, to effect engagement of the stone 54 with the chain portion 23 on the sprocket. The degree of rocking of the arm 47 is regulated by the adjusted position of the screw 53 against which the arm portion 51 will abut. Thus, the adjustment of the screw 53 will determine the amount of metal to be removed from the chain 23. In order to avoid the formation of a groove in the stone 54, the shaft 32 is reciprocated axially by manipulating the knob to effect oscillation of the stone, preferably within the limits illustrated by the broken lines in FIG. 10. Thus, the entire face of the stone 54 is presented against the chain 23 and is utilized for sharpening. As will be apparent by reference to FIG. 10, the arm portion 51 is of sufficient length such that it will engage the end of the adjusting screw 53 in its full limit of movement. It will be understood that as the stone 54 and chain 23 wear progressively, adjustment of the screw 53 will be required in order to permit further counterclockwise movement of the arm 47, as viewed in FIG. 8, so as to permit engagement of the stone with the chain.

Figure 7:
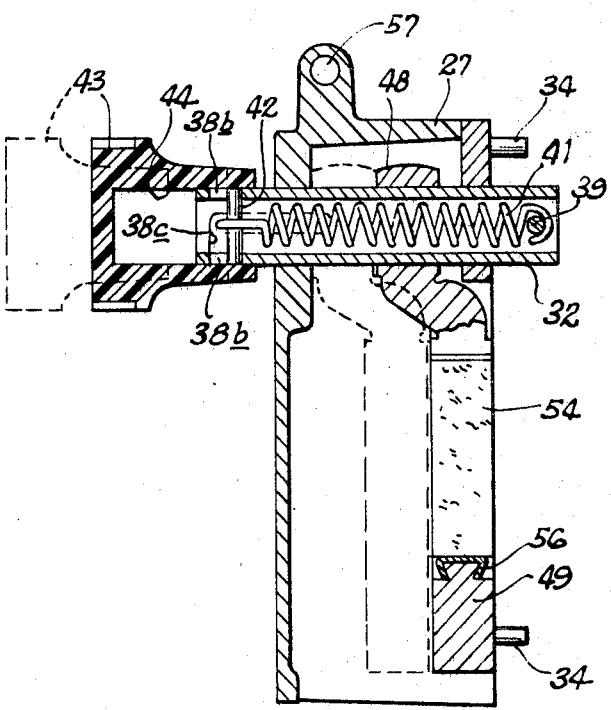
FIG. 7 is a view similar to FIG. 6 but showing the sharpening element in operative position.

Upon completion of the sharpening operation, the operating knob 43 is moved to the dotted line position illustrated in FIG. 7, at which point the knob is manipulated to remove the pin 42 from the slots 38b and place it in the slots 38a as illustrated in FIG. 6 whereupon the spring 41 then draws the knob 43 into abutment with the wall 28 of the housing corresponding to nonoperating position.

It will be understood that the sharpening operation may be effected during the course of operation of the chain saw so that the saw need not be taken out of operation or dismantled for purposes of sharpening.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:

1. A device for sharpening a saw chain while the chain is mounted upon a sprocket and guide bar of a chain saw and while being driven by said sprocket, said device comprising a housing adapted to be mounted on the body of the chain saw to enclose said sprocket and a portion of said guide bar, a shaft supported in said housing parallel to the axis of said sprocket and rearwardly thereof for rotatable and axial movement, an arm fixed on said shaft and supporting an arcuate sharpening element in close proximity to said sprocket, an operating knob telescopically supported on said shaft exteriorally of said housing and releasable locking means to releasably lock the operating knob in a telescopically extended position relative to the shaft for selectively moving said sharpening element to a nonoperative position remote from the chain portion on said sprocket or to an operative position in contact with the chain portion advancing around the periphery of said sprocket.

2. The invention as defined in claim 1 in which the shaft is hollow and has a pair of connecting slots, one longer than the other, and the knob has a pin which is selectively receivable in one of said slots, said slots limiting the telescoping relation of said knob on said shaft.

3. The invention as defined in claim 1 including an extension on said arm and adjustable screw means carried on said housing and adapted to be engaged by said extension for adjusting the operating position of the sharpening element.

4. The invention as defined in claim 1 including spring means between the operating knob and the shaft for urging the operating knob and the shaft into a telescopically overlapping position.

5. The invention as defined in claim 1 in which the arm includes a forwardly extending lateral projection and said housing includes an abutment adapted to be engaged by said extension to maintain said sharpening element in non-operative position.

6. The invention as defined in claim 5 including adjustable screw means carried on said housing and adapted to engage said extension for adjusting the operative position of the sharpening element.

7. The invention as defined in claim 6 in which the adjustable screw means includes detent means for maintaining said screw means in a position of adjustment.

8. The invention as defined in claim 1 in which the shaft is hollow and the operating knob is rotatably and slideably supported on said shaft, said shaft having bayonet type slots and said knob having a pin fixed thereto and movable in said slots.

9. The invention as defined in claim 1 in which said sharpening element is oscillatable with said shaft axially thereof.

References Cited
UNITED STATES PATENTS 3,301,098    1/1967    Oehrli _____ 76—37
3,435,860    4/1969    Silvon _____ 76—37 XR H. A. KILBY, Jr., Primary Examiner U.S. Cl. X.R.

143—32